Aug. 25, 1953                J. H. PENN ET AL                2,649,822
                       APPARATUS FOR PROCESSING CORDAGE
Filed Feb. 21, 1949                                    6 Sheets-Sheet 1

FIG. 1

INVENTORS
J. H. PENN
P. R. POWELL
BY
ATTORNEY

Aug. 25, 1953     J. H. PENN ET AL     2,649,822
APPARATUS FOR PROCESSING CORDAGE
Filed Feb. 21, 1949     6 Sheets-Sheet 5

INVENTORS
J. H. PENN
P. R. POWELL
BY
ATTORNEY

FIG. 7

INVENTORS
J. H. PENN
P. R. POWELL

Patented Aug. 25, 1953

2,649,822

UNITED STATES PATENT OFFICE 2,649,822

APPARATUS FOR PROCESSING CORDAGE

Julius H. Penn, Dunmore, Pa., and Paul R. Powell, Baltimore, Md., assignors to Western Electric Company, Incorporated, New York, N. Y., a corporation of New York Application February 21, 1949, Serial No. 77,546

16 Claims. (Cl. 81—9.51)

This invention relates to apparatus for processing cordage, and more particularly to apparatus for continuously ring cutting, slitting and stripping portions of coverings of cordage.

In the manufacture of tipped, jacketed cords, the cords are usually formed by cutting long lengths of jacketed cordage into cord length and removing end portions of the jacket from the cordage generally by manually ring-cutting, slitting and stripping the jacket. Such manual operations are time-consuming and expensive. In the past, there has been known no satisfactory apparatus capable of automatically removing end portions of a jacket from cordage.

An object of the invention is to provide new and improved apparatus for processing cordage.

A further object of the invention is to provide apparatus for continuously ring-cutting, slitting and stripping portions of cordage.

An apparatus illustrating certain features of the invention may include means for advancing cordage having a covering along a predetermined path, means for ring-cutting the covering at spaced points thereon, means for slitting the covering between two of said points, and means for removing the slit portion of the covering from the cordage.

A complete understanding of the invention may be obtained from the following detailed description of an apparatus forming a specific embodiment thereof, when read in conjunction with the appended drawings, in which.

Figure 1:
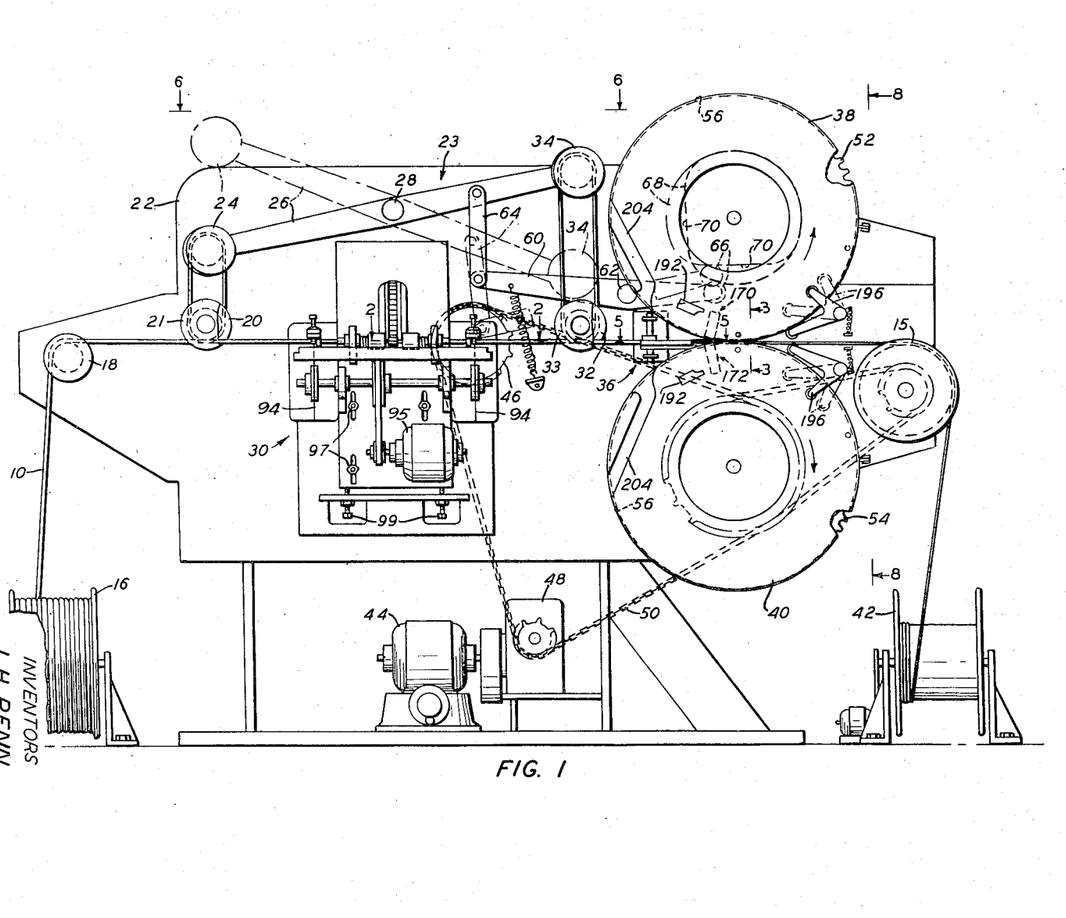
Fig. 1 is a front elevation view of an apparatus forming one embodiment of the invention with portions thereof broken away.
Figure 2:
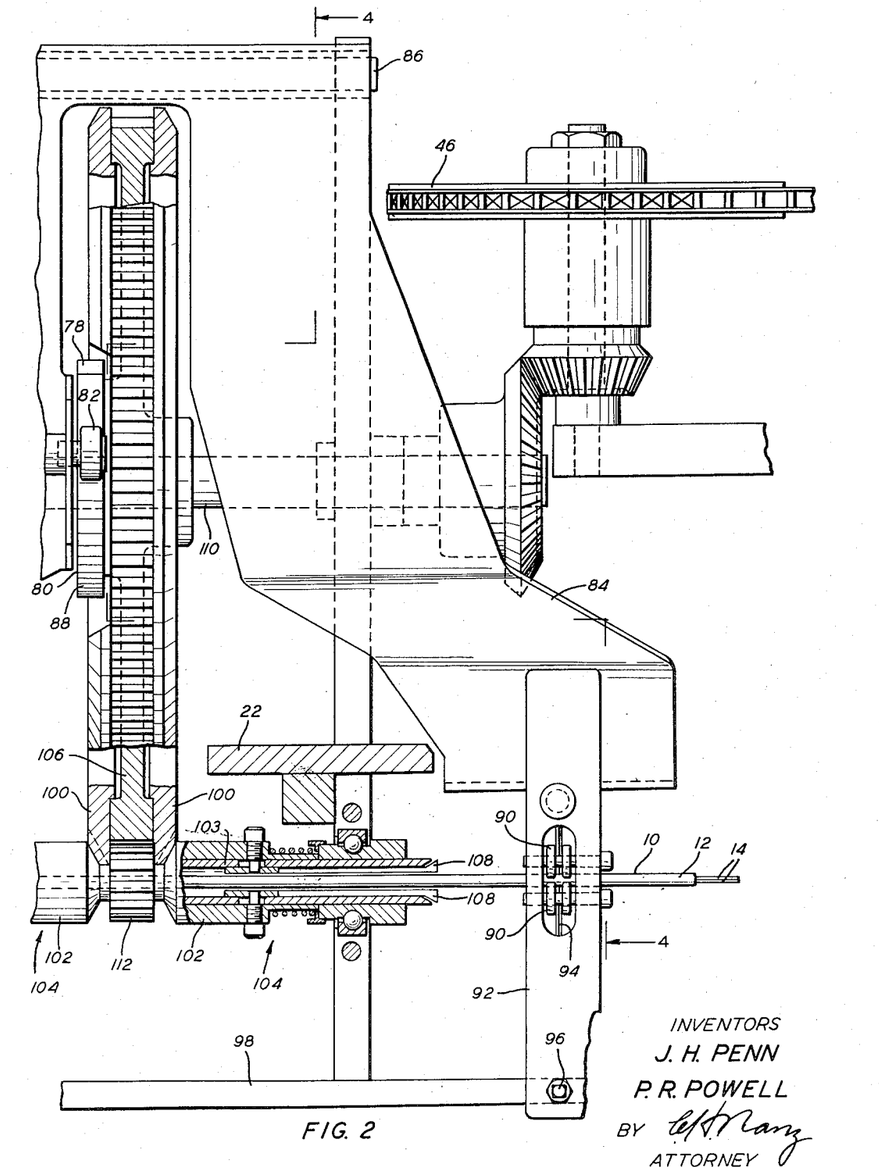
Fig. 2 is an enlarged, horizontal section taken along line 2—2 of Fig. 1.

Referring now in detail to the drawings, cordage 10 (Figs. 1 and 2) including a jacket 12 and individually insulated conductors 14—14 is advanced continuously at a constant rate of speed by a capstan 15 from a supply reel 16, over a guide pulley 18 to individually rotatable grooved sheaves 20 and 21 mounted rotatably on a fixed plate 22 and forming a portion of a walking beam storage device 23. The cordage extends in one complete loop around the sheaves 20 and 21, a sheave 24 mounted rotatably on a lever 26 pivoted at the midpoint thereof on a pin 28 fixed to the plate 22, and travels through a ring-cutter 30 mounted on the plate to one of individually rotatable, grooved sheaves 32 or 33 mounted rotatably on the plate. The cordage extends in one complete loop around the sheave 32, a grooved sheave 34 carried by the lever 26 and the sheave 33, and goes from the sheave 33 to and through a slitter 36 and between stripping discs 38 and 40 to the capstan 15 from which it is taken up by a separately driven takeup reel 42.

An electric motor 44 drives a sprocket 46 and the stripping disc 40 through a gear box 48 and a chain 50, and the disc 38 is driven by the disc 40 through gears 52 and 54 at the same rate of speed as, but in a direction opposite to that in which the disc 40 is rotated. The discs are provided with peripheral grooves 56 and 58, and engage the cordage 10 therebetween. The discs are driven at the same peripheral rate of speed as the linear rate of speed at which the cordage is advanced by the capstan 15, which is driven positively through the drive of the disc 40.

One end of an actuating lever 60 mounted pivotally on a pin 62 projecting from the plate 22 is connected by a link 64 to the lever 26, and the other end thereof carries a cam follower 66 which is biased against a cam 68 carried with the disc 38. As the cam is turned to the position thereof shown in broken lines in Fig. 1, the cam follower is moved from the dotted-line position thereof to the broken-line position thereof and engages a dwell portion 70 of the cam. As the cam follower is so moved, the lever 60 moves the lever 26 and the sheaves 24 and 34 from their full-line positions to their broken-line positions. During such movement, the sheave 24 is moved farther from the sheaves 20 and 21 thereby lengthening the cordage looped around these sheaves, and simultaneously the sheave 34 is moved the same distance toward the sheaves 32 and 33 thereby shortening the cordage looped around these sheaves the same length that the cordage on the sheaves 24, 20 and 21 is lengthened.

Since the sheaves 32, 33 and 34 give up cordage stored thereby at the same rate that the sheaves 20, 21 and 24 take up cordage for storage, the rate of speed at which the cordage is advanced from the supply reel 16 to the sheave 20 and from the sheave 32 to the capstan 15 is not affected by such movement of the sheaves 24 and 34. However, these movements of the sheaves 24 and 34 are at such a rate that the sheaves 20, 21 and 24 take up additional cordage and the sheaves 32, 33 and 34 give up cordage at the same rate of speed as that at which the capstan 15 advances the cordage so that the portion of the cordage between the sheave 21 and the sheave 32 is stationary during such movements of the sheaves 24 and 34.

Figure 4:
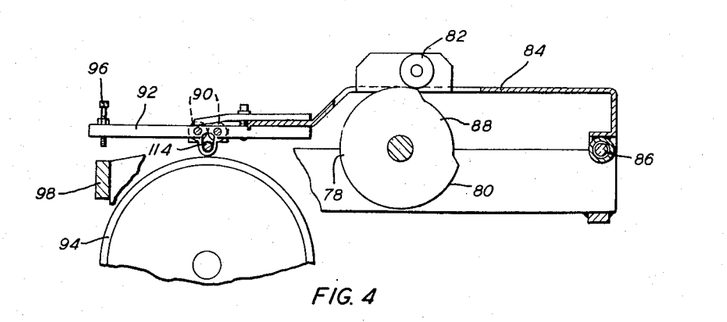
Fig. 4 is an enlarged, vertical section taken along line 4—4 of Fig. 2.
Figure 6:
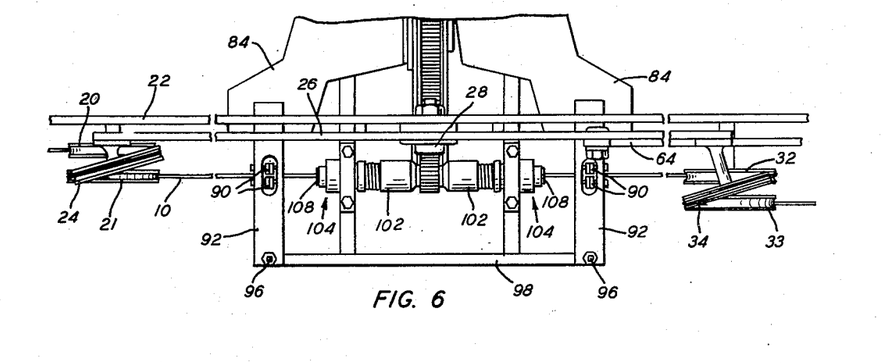
Fig. 6 is an enlarged, fragmentary, plan view taken along line 6—6 of Fig. 1.

Shortly after the portion of the cordage 10 between the sheaves 21 and 32 becomes stationary, a lobe 78 of a cam 80 (Figs. 2 and 4), which is driven by the sprocket 46, of the ring cutter 30, is moved out of engagement with a cam follower 82 supporting a yoke 84 mounted pivotally on a pin 86, and a dwell portion 88 of the cam 80 is moved opposite to the follower 82. This permits the yoke to pivot by gravity in a counterclockwise direction, as viewed in Fig. 4, and pairs of grooved backing rollers 90—90 carried by arms 92—92 (Fig. 6) clamped to the yoke engage spaced portions of the cordage and press these portions of the cordage against rapidly rotating cutting discs 94—94 (Figs. 1 and 4) driven by an electric motor 95. The cutting discs cut into the jacket 12 of the cordage to a predetermined depth permitted by adjustment screws 96—96 and a stop bar 98, which depth is almost as great as the wall-thickness of the jacket. Adjustment as to height of the cutting discs is provided by loosenable clamping bolts 97—97 and adjustment screws 99—99 carried by the plate 22.

As the cordage 10 is pressed toward the cutting discs 94—94 by the yoke 84, cams 100—100 (Fig. 2) engaged by spring-pressed follower sleeves 102—102 of collets 104—104, which are mounted slidably on a bushing 103, are rotated by a gear 106 to positions permitting the follower sleeves to close split chuck jaws 108—108 on the portions of the cordage adjacent thereto. The jaws 108—108 then grip the cordage tightly, and the gear 106, which is driven by a shaft 110 driving the cam 80, rotates the collets through a gear 112 formed on the bushing 103. The collets then rotate the portions of the cordage engaged by the cutting discs 94—94 through somewhat over 360° so that the jacket of the cordage is cut completely around at the points engaged by the cutting discs. The cams 100—100 then actuate the collets 104—104 to release the cordage as the cam 80 moves the yoke 84 away from the cutting discs and guide loops 114—114 secured to the arms 92—92 move the cordage away from the cutting discs.

The cam 68 (Fig. 1) then causes movement of the lever 26 from its broken-line position to its full-line position, and keeps it in this position until just prior to the next ring-cutting operation, occurring almost one revolution of the cam 68 away. As the lever is moved to its full-line position, the cordage is given up by the sheaves 20, 21 and 24 and is taken up by the sheaves 32, 33 and 34 in equal lengths so that the rate of speed of the portions of the cordage to the left of the sheave 20, as viewed in Fig. 1, and to the right of the sheave 32 is unaffected.

The slitter 36 (Figs. 1 and 5) includes a pair of knife arms 120 and 122 mounted pivotally on posts 124 and 126, respectively, mounted on a bracket 128 secured to the plate 22. The arms 120 and 122 are provided with intermeshing segmental gears 130 and 132, respectively, and carry removable slitting blades 134 and 136, respectively, in positions offset therefrom, and the arm 120 carries a cam follower 138, which is biased by a spring 140 against a cam 142 fastened to the stripping disc 38. The spring 140 secured to the arms 120 and 122 urges the arms toward one another and the knives 134 and 136 toward the cordage 10 guided therebetween by guide arms 144 and 146 having grooves 148 and 150, respectively, and mounted pivotally on the posts 124 and 126. The guide arms are urged against the cordage by compression springs 152—152 mounted on adjustment screws 154—154 screwed through lugs 156—156 projecting from the knife arms 120 and 122.

Figure 5:
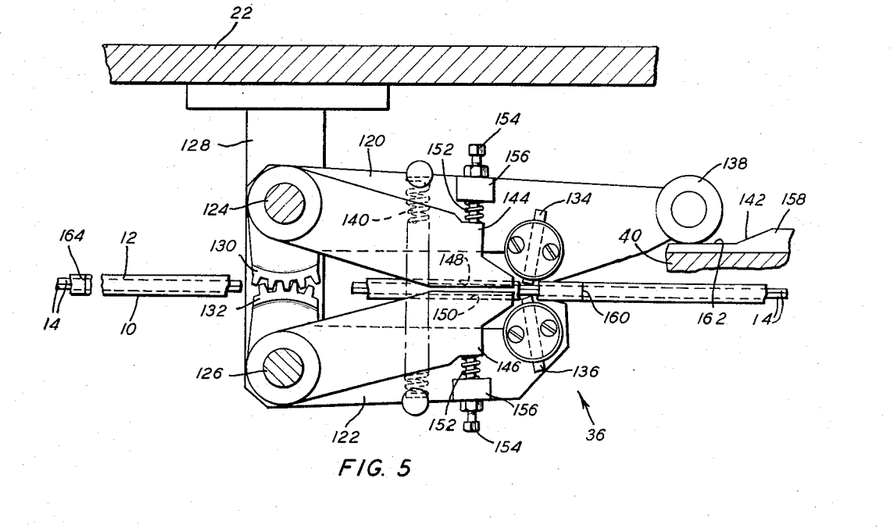
Fig. 5 is an enlarged, horizontal section taken along line 5—5 of Fig. 1.

While a portion of the cordage 10 not to be slit passes between the knives 134 and 136, a lobe 158 of the cam 142 engages the cam follower 138, thereby holding the knife arms in positions holding the knives 134 and 136 separated and away from the cordage. While the knives are held separate, the springs 152—152 urge the guide arms 144 against the cordage to center the cordage between the knives and keep the cordage out of contact with the knives.

As a ring cut 160 is formed in the cordage 10, which is the advance one of a pair of ring cuts formed simultaneously, arrives at a position abreast the knives 134 and 136, the cam lobe 158 is moved out of engagement with the cam follower 138, and a dwell portion 162 of the cam 142 is moved abreast the follower 138. The spring 140 then closes the knife arms 120 and 122 to the extent permitted by the adjustment screws 154—154 engaging the guide arms 144 and 146, which extent is just sufficient to cause the knives 134 and 136 to cut almost completely through the jacket 12 at opposite sides thereof. The jacket then is slit from the ring cut 160 to a ring cut 164, which is the trailing ring cut therebehind of the simultaneously formed pair. As the ring cut 164 arrives at the knives, the beginning portion of the lobe 158 of the cam 142 is revolved by the disc 38 into engagement with the cam follower 138 to move the knives away from the cordage. Thus, the slitter 36 forms opposed slits in the jacket 12 of the continuously moving cordage 10 from the ring cut 160 to the ring cut 164 in synchronism with the movement of the disc 38, the operation of the ring cutter 30 and the advancement of the cordage by the capstan 15.

Figure 3:
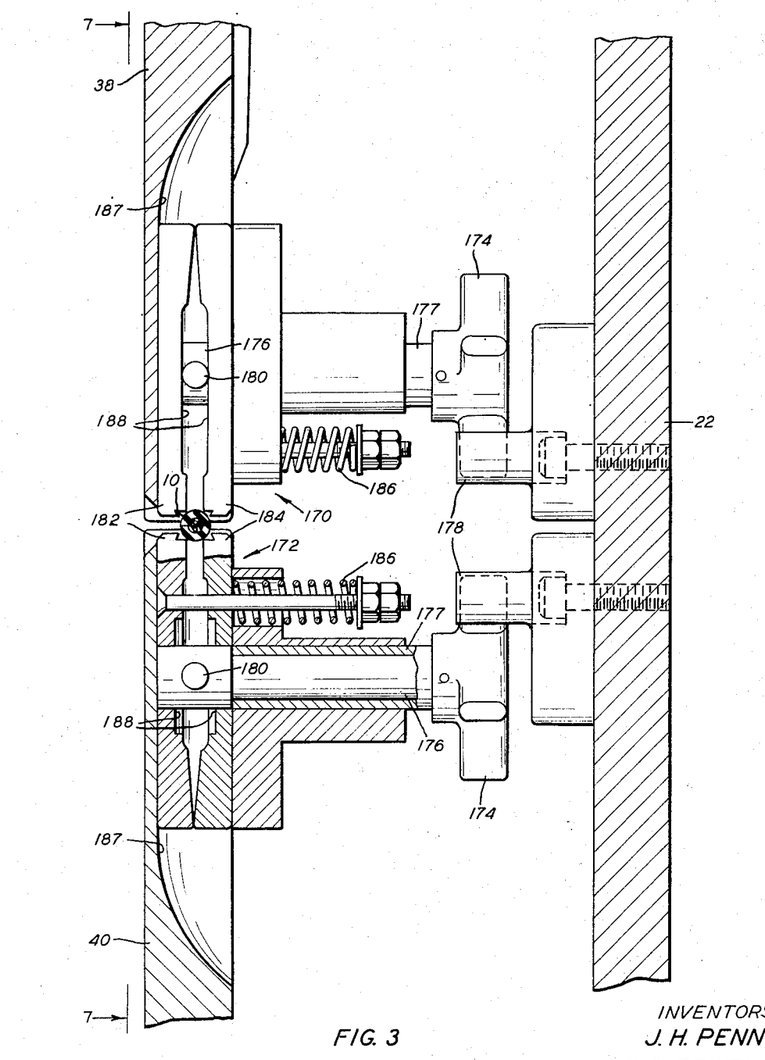
Fig. 3 is an enlarged, vertical section taken along line 3—3 of Fig. 1.
Figure 7:
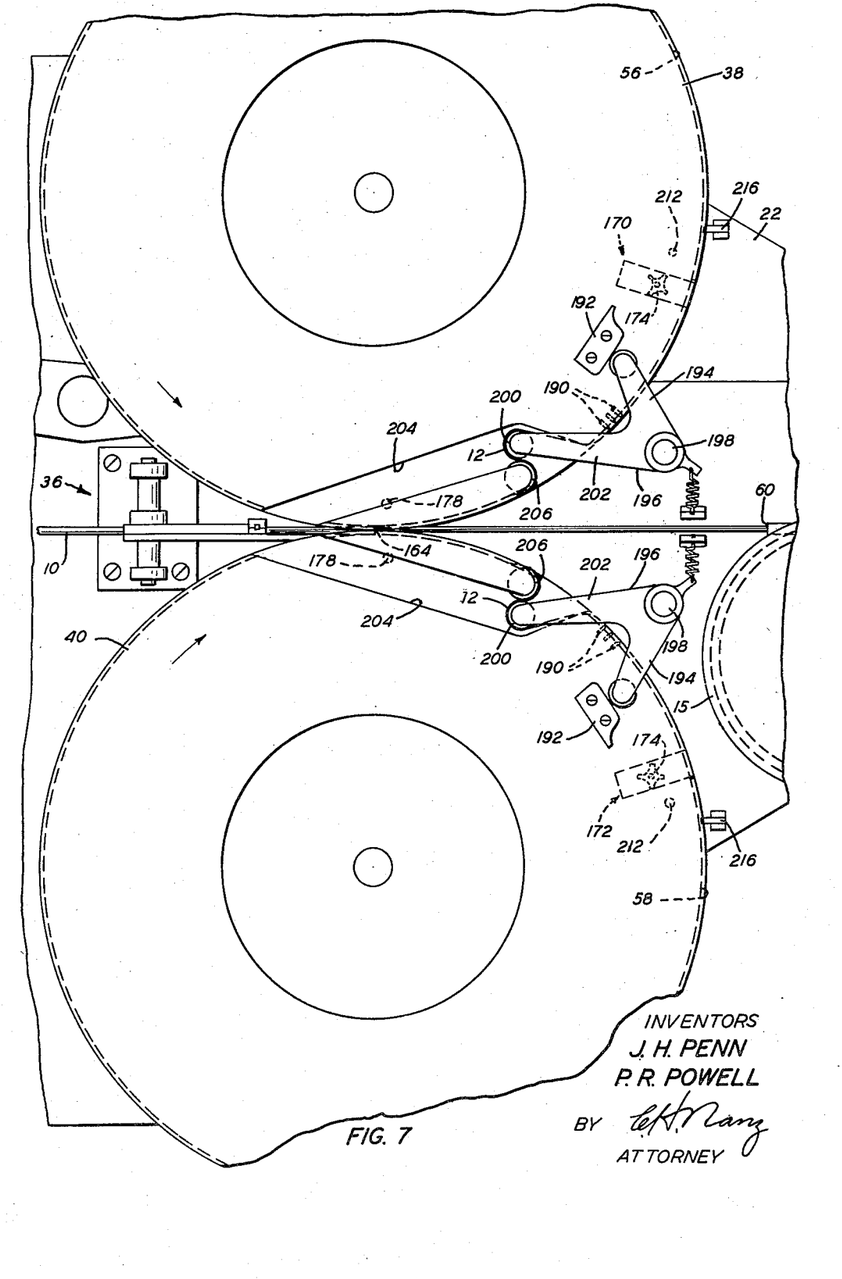
Fig. 7 is an enlarged, fragmentary front elevation of the apparatus taken along line 7—7 of Fig. 3 with elements in different positions.
Figure 8:
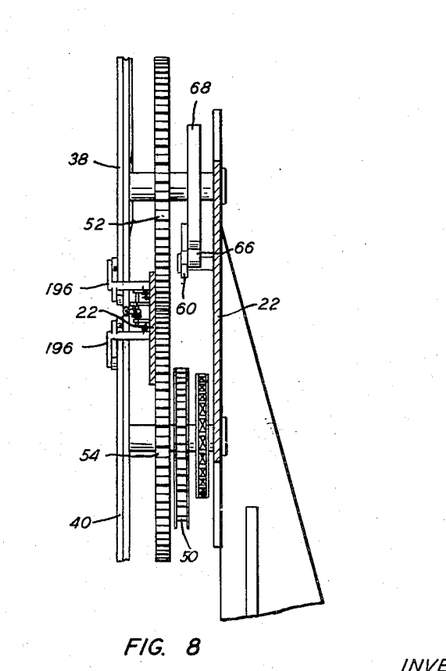
Fig. 8 is an enlarged, vertical view taken along line 8—8 of Fig. 1.

Just after the ring cut 160 is advanced to the point of tangency or bite of the stripping discs 38 and 40, grippers 170 and 172 (Figs. 1, 3 and 7) are moved into engagement with the cordage at points spaced just behind the ring cut 160. As the grippers are so moved, pinions 174—174 keyed to shafts 176—176 mounted in fixed bearings 177—177 engage pins 178—178 fastened to the plate 22, and are turned 90°. This turning of the pinions revolves pins 180—180 extending transversely to the shafts 176—176 from positions holding jaws 182—182 away from jaws 184—184 against the actions of compression springs 186—186 to positions extending along grooves 188—188 formed in the jaws 182—182 and 184—184, and the springs 186—186 close the jaws on the portions of the jacket on opposite sides of the cordage and separated by the slits formed by the slitter 36. The jaws 182—182 and 184—184 are mounted in sockets 187—187 formed in the discs 38 and 40. The pairs of jaws 182—182 and 184—184 grip the portions of the jacket firmly, and as the discs 38 and 40 are turned, pull the gripped portions of the jacket apart along the slits and from the cordage starting with the ring cut 160 and separating along the slits in the jacket.

As the stripping disc 38 and 40 rotate, pointed pins 190—190 carried by these discs behind the grippers 170 and 172 impale the jacket 12 and aid the grippers in pulling the portions of the jacket separated by the slits apart and from the cordage. As the ring cut 164 approaches the bite of the stripping discs 38 and 40, cams 192—192 carried by the stripping discs engage arms 194—194 of bellcrank levers 196—196 mounted on posts 198—198 secured to the plate 22 to move rollers 200—200 carried by arms 202—202 of the bellcrank levers into guide grooves 204—204 formed in the stripping discs. As the rollers are so moved, they engage the stripped portions of the jacket and roll these portions into the guide grooves, thereby placing the stripped portions of the jacket under tension back to the bite of the stripping discs. Rollers 206—206 facilitate movement of the stripped portions of the jacket as these portions are stretched so that the tensile stress is transmitted along these portions to the bite of the stripping discs. As the ring cut 164 comes to the bite of the discs, the tension on the portions of the jacket being stripped break any portions of the jacket not cut completely through at the ring cut 164 so that the stripped portions of the jacket are separated completely from the cordage. Just after the stripped portions of the jacket are separated completely from the cordage, the cams 192—192 move out of engagement with the arms 194—194 of the bellcrank levers 196—196 to permit free movement of the bellcranks as the rollers 200—200 roll through the grooves 204—204 and are biased against the peripheries of the stripping discs by tension springs 210—210.

As the grippers 170 and 172 are rotated further, the pinions 174—174 (Fig. 3) engage pins 212—212 (Fig. 1), and are turned 90°. This turns the pins 180—180 (Fig. 3) to positions transverse to the grooves 188—188 to open the jaws 182—182 and 184—184 thereby releasing the stripped portions of the jacket. The forward ends of the stripped portions of the jacket then are moved into engagement with stripping fingers 216—216 extending to the peripheries of the stripping discs 38 and 40. The fingers 216—216 lift the stripped portions out of the grippers, off the pins 190—190 and out of the grooves 56 and 58 in the stripping discs so that the stripped portions fall off the stripping discs.

The circumference of the grooves 56 and 58 are equal and of a length equal to that of a portion of the cordage from one ring cut to the ring cut once removed therefrom. Hence, the apparatus described hereinabove strips portions of the jacket of uniform length and spaced uniformly along the cordage.

*Operation*

The apparatus described hereinabove advances the cordage continuously at a constant rate of speed from the supply reel 16, which is braked, to the sheave 20 and from the sheave 33, past the slitter 36 and the stripping discs 38 and 40 and around the capstan 15, to the takeup reel 42 at that rate of speed. The movement of the cordage from the sheave 21 to the sheave 32 is in a cycle for each cord length of the cordage, each cycle including no movement while the ring cutter 30 ring cuts the cordage, movement above the rate of speed caused by the capstan 15 after each pair of ring cuts are made, and movement at the capstan rate of speed between these two variants while the lever 26 is stationary. The sheaves 32, 33 and 34 give up cordage while the portion of the cordage between the sheaves 21 and 32 is stationary and the sheaves 20, 21 and 24 take up the cordage simultaneously with the giving up thereof. Conversely, after each pair of ring cuts is made, the sheaves 20, 21 and 24 give up length of cordage and the sheaves 32, 33 and 34 take up length of the cordage at an equal rate of speed.

While the portion of the cordage 10 between the sheaves 21 and 32 is stationary, the cam 80 (Figs. 2 and 4) actuates the yoke 84 to move the cordage into engagement with the cutting discs 94—94, and the cams 100—100 and the gear 106 actuate the collets 104—104 to grip the cordage and turn it so that it is ring cut by the cutting discs. This occurs every cord length at points spaced uniformly from the preceding and succeeding respective ring cuts.

The cordage 10 having been ring cut is advanced from the sheave 32 through the slitter 36 with such timing that the cam 142 (Fig. 5) actuates the knife arms 120 and 122 to move together and start the slitting just after the leading ring cut of a pair of simultaneously formed ring cuts clears the knives 134 and 136. The guide arms 144 and 146 and the adjustment screws 154—154 limit depth of cut of the knives, and keep the cordage centered between the knives. The knives slit the jacket between the two ring cuts, and the cam 142 moves the knives apart as the second ring cut arrives at the knives.

The grippers 170 and 172 (Figs. 1 and 3) are actuated by the pins 178—178 to firmly grip slit portions of the jacket 12 just behind each leading ring cut, and the grippers and stripping discs 38 and 40 pull the slit portions of the jacket from the cordage. The pins 190—190 impale the jacket portions to be stripped, and the cams 192—192 actuate the bellcrank levers 196—196 and rollers 200—200 to tension the stripped portions to separate them completely from the cordage at the trailing ring cut. The pins 214—214 then actuate the grippers to release the stripped portions of the jacket, and the stripper arms 216—216 peel the stripped portions from the peripheries of the stripping discs 38 and 40. The stripped portions then fall into waste receptacles (not shown).

The above-described apparatus serves to continuously advance the cordage at a high rate of speed without interruption in the paying out and taking up of the cordage while it periodically ring cuts, slits and strips the cordage accurately and uniformly. The walking beam storage device 23 provides periodically stationary portions of the cordage without interruptions in the advancement of the cordage.

The article-advancing device per se is disclosed and claimed in copending application Serial No. 77,547, filed February 21, 1949, by P. R. Powell for "Apparatus for Advancing Filamentary Articles."

In the use of the terms "filamentary article," "filament," or the like, it is intended to include cordage, twine, wire, covered conductors, tapes and the like.

What is claimed is:

1. A ring cutter, which comprises a pair of rotatable cutting discs mounted for rotation on the same axis and spaced a predetermined distance apart, means for rotating the cutting discs, guides for guiding cordage past the discs, means for holding the guides in alternate positions in which the guides hold the cordage out of engagement with the discs and hold the cordage in engagement with the discs, a hollow chuck positioned near the discs and through which the cordage passes, means for rotating the chuck, and means for actuating the chuck to grip the cordage and turn the cordage on its longitudinal axis while the cordage is in engagement with the discs, whereby the cutting discs ring cut the cordage.

2. A ring cutter, which comprises a rotatable cutting disc, means for rotating the cutting disc, guide means for guiding cordage past the disc, means for holding the guide means alternately in a position in which the guide means holds the cordage out of engagement with the disc and in a position in which the guide means holds the cordage in engagement with the disc, a hollow chuck positioned near the disc and through which the cordage passes, means for rotataing the chuck, and means for actuating the chuck to grip the cordage and turn the cordage on its longitudinal axis while the guide means hold the cordage against the disc, whereby the cutting disc ring cuts the cordage.

3. A ring cutter, which comprises a pair of rotatable cutting discs mounted for rotation on the same axis and spaced a predetermined distance apart, means for rotating the cutting discs, guides for guiding cordage past the discs, a pivoted frame carrying the guides, a cam for holding said frame alternately in a position in which the guides hold the cordage out of engagement with the discs and in a position in which the guides hold the cordage in engagement with the discs, hollow chucks positioned near the discs and through which the cordage passes, means for rotating the chucks, and means for actuating the chucks to cause the chucks to grip the cordage and turn the cordage on its longitudinal axis while the guide means hold the cordage in engagement with the cutting discs, whereby the cutting discs ring cut the cordage.

4. A ring cutter, which comprises a pair of laterally spaced cutting discs, means for rotating the cutting discs, a pair of guides including presser rollers for guiding cordage, a frame supporting the guides in positions offset from the cutting discs, cam means normally holding the frame in a position in which the guides hold cordage out of contact with the cutting discs and periodically operable to actuate the frame to move the cordage into contact with the cutting discs, adjustable stopping means for limiting movement of the cordage toward the cutting discs, a pair of chucks mounted rotatably in aligned positions extending between the guide means, each of said chucks having a spring-pressed actuating sleeve, a pinion connected rigidly to the chucks and positioned therebetween, a gear engaging the pinion for rotating the chucks, and cams carried by the gear for actuating the sleeves of the chucks to periodically grip cordage advanced through the chucks, whereby the cordage is turned about its own axis so that the cutting discs ring cut the cordage.

5. An apparatus for stripping jackets from cordage having a slit jacket, which comprises a disc, means for advancing the cordage tangentially with respect to the disc, means for holding cordage against the periphery of the disc, means for rotating the disc with the same peripheral speed as the linear speed of the cordage, a pair of relatively movable jaws carried by the disc in the plane thereof and at the periphery thereof, means urging the jaws together, a latch for holding the jaws apart, means operable as the jaws reach the cordage for actuating the latch to permit the jaws to grip a portion of the slit jacket, whereby said portion is pulled from the cordage as the jaws are moved with the disc, means for actuating the latch to open the jaws and release the stripped portion of the cordage, and means for removing the stripped portion of the cordage from the disc.

6. A stripper, which comprises a disc having a groove therein, means for holding cordage having a slit jacket against the groove in the periphery of the disc, a pair of elongated members having jaw portions carried by the disc in positions in which the jaws bracket the peripheral groove in the disc, each of the members having a longitudinal groove therein, a shaft, a pin carried by the shaft and movable thereby between a position in which a pin extends transversely to the grooves in the levers to hold the jaws open and to a position in which the pin extends parallel to the grooves in the levers to permit the jaws to be closed, means for urging the jaws toward closed positions, means for turning the shaft to move the pin to the position thereof parallel with the grooves of the levers when the jaws bracket a portion of a jacketed conductor held in the groove in the disc, and means for actuating the jaws to release a portion of the jacket after this portion of the jacket has been stripped from the rest of the cordage.

7. A ring cutter, which comprises a pair of laterally spaced cutting discs, means for rotating the cutting discs, a pair of guides for guiding cordage past the discs, a frame supporting the guides in positions offset from and near the cutting discs, means for holding the frame alternately in a position in which the guides hold the cordage out of contact with the cutting discs and in a position in which the guides hold the cordage in contact with the cutting discs, cordage-gripping means mounted rotatably in a position extending between the guides, means for actuating the cordage-gripping means through the engagement of the cordage with the cutting discs, and means for rotating the cordage-gripping means, whereby the cordage is turned about its own axis so that the cutting discs ring cut the cordage.

8. A ring cutter, which comprises a pair of laterally spaced cutting discs, means for rotating the cutting discs, a pair of guides including presser rollers for guiding cordage past the discs, a frame supporting the guides in positions transverse in alignment with the cutting discs, cam means normally holding the frame in a position in which the guides hold cordage out of contact with the cutting discs and periodically operable to actuate the frame to move the cordage into contact with the cutting discs, stopping means for limiting movement of the frame toward the cutting discs, a pair of chucks mounted rotatably in aligned positions extending between the guide means, each of said chucks having actuating means for causing the chucks to grip the cordage, a pinion connected rigidly to the chucks positioned therebetween, a gear engaging the pinion for rotating the chucks, and means carried by the gear for operating the actuating means of the chucks to periodically grip cordage advanced through the chucks, whereby the cordage is turned about its own axis so that the cutting discs ring cut the cordage.

9. An apparatus for stripping cordage having a slit jacket, which comprises a disc, means for advancing the cordage tangentially with respect to the disc, means for holding the cordage against the periphery of the disc, means for rotating the disc at the same peripheral speed as the linear speed of the cordage, means carried by the disc for engaging the jacket to strip the jacket from the cordage, whereby the slit jacket is pulled from the cordage as the jacket-engaging means is moved with the disc, said disc being provided with a generally chordal groove therein positioned behind the jacket-engaging means as this means is rotated with the disc, a bellcrank lever having a roller on one arm thereof urged against the periphery of the disc, a cam carried by the disc and engaging the other arm of the bellcrank lever to move the roller against a stripped portion of the jacket and into the groove in the disc so that the stripped portion of the jacket is tensioned, and means operable after the roller has been moved into the groove for releasing the jacket from the jacket-engaging means.

10. An apparatus for stripping jackets from cordage having slit jackets, which comprises a disc, means for advancing the cordage tangentially with respect to the disc, means for holding the cordage against the periphery of the disc, means for rotating the disc with the same peripheral speed as the linear speed of the cordage, means carried by the disc for engaging the slit jacket to pull it from the cordage as the jacket-engaging means is moved with the disc, said disc being provided with a cut-away portion positioned behind the jacket-engaging means as it is rotated with the disc, a presser, and means for moving the presser against a stripped portion of the jacket and into the cut-away portion in the disc so that the stripped portion of the jacket is tensioned.

11. A stripper, which comprises a disc having a groove therein, means for holding cordage having a slit jacket against the groove in the periphery of the disc, a pair of members having jaw portions carried by the disc in positions in which the jaws bracket the peripheral groove in the disc, at least one of the members having a longitudinal groove therein, a rotatable shaft, a pin secured rigidly to the shaft in such a position that when the shaft rotates the pin is moved between a position in which the pin extends transversely to the groove in the member to hold the jaws open and a position in which the pin extends parallel to the groove in the member to permit the jaws to be closed, means for urging the jaws toward closed positions and means for turning the shaft to move the pin to the position thereof parallel with the groove in the member when the jaws bracket a portion of a jacketed conductor held in the groove in the disc, and means for turning the shaft to the position thereof in which the pin holds the jaws open to release a portion of the jacket after this portion of the jacket has been stripped from the rest of the cordage.

12. An apparatus for stripping cordage having slit jackets, which comprises a pair of discs having peripheral grooves therein and mounted for rotation in a single plane and in tangential relationship, means for advancing the cordage having a slit jacket thereon between the edges of the discs at a predetermined rate of speed, means for rotating the discs at peripheral speeds equal to the speed of the advancing cordage and in such directions that the portions thereof adjacent to the cordage advance in the direction of movement of said cordage, jacket-gripping jaws mounted on the discs, and means for closing the jaws carried by the discs as the jaws are carried to the point of tangency of the discs, whereby the jaws grip portions of the jacket separated by the slits formed therein and these portions of the jacket are pulled away from the cordage and carried along the peripheries of the discs.

13. Apparatus for removing equally spaced portions of the covering from continuous lengths of jacketed cordage, which comprises means for continuously advancing a length of such cordage from a supply thereof along a predetermined path, a plurality of cutting blades mounted at spaced positions along and transverse to said path, means operable in timed relationship with respect to the cordage-advancing means for temporarily stopping at periodic intervals the longitudinal movement of the portion of the cordage adjacent to the cutting blades, means for simultaneously pressing the stopped portion of the cordage against the spaced blades, means for turning the stopped portion of the cordage about its longitudinal axis while the cordage engages the blades so that the covering is ring cut at spaced points, movable means positioned adjacent to a subsequent point in said path where the cordage is continuously advancing for slitting the covering of the cordage longitudinally on opposite sides thereof, means for periodically moving the slitting means into engagement with a portion of the cordage between the ring cuts made by the blades to slit the covering therebetween, and means subsequently engaged by the advancing cordage for removing the slitted portions of the covering from the cordage.

14. Apparatus for removing equally spaced portions of the covering from continuous lengths of jacketed cordage, which comprises means for continuously advancing a length of such cordage from a supply thereof along a predetermined path, a plurality of cutting blades mounted at spaced positions along and transverse to said path, means operable in timed relationship with respect to the cordage-advancing means for temporarily stopping at periodic intervals the longitudinal movement of the portion of the cordage adjacent to the cutting blades, means for simultaneously pressing the stopped portion of the cordage against the spaced blades, means for turning the stopped portion of the cordage about its longitudinal axis while the cordage engages the blades so that the covering is ring cut at spaced points, movable means positioned adjacent to a susbequent point in said path where the cordage is continuously advancing for slitting the covering of the cordage longitudinally on opposite sides thereof, means for periodically moving the slitting means into engagement with a portion of the cordage to slit the covering, stripping means subsequently engaged by the advancing cordage for removing the slitted portions of the covering from the cordage, and means for operating the slitting means and the stripping means in synchronism with the cord advancing means, whereby the slitting means slits the portion of the covering between the ring cuts previously made by the blades and the stripping means subsequently engages and strips said ring cut and slitted portion from the continuously advancing cordage.

15. Apparatus for removing equally spaced portions of the covering from continuous lengths of jacketed cordage, which comprises means for continuously advancing a length of such cordage from a supply thereof along a predetermined path, a plurality of rotary cutting blades mounted at spaced positions along and transverse to said path, means for rotating said cutting blades, means operable for temporarily stopping at periodic intervals the longitudinal movement of the portion of the cordage adjacent to the cutting blades, means for simultaneously pressing the stopped portion of the cordage against the spaced, rotating blades, means for turning the stopped portion of the cordage about its longitudinal axis while the cordage engages the blades so that the covering is ring cut at spaced points, movable means positioned adjacent to a subsequent point in said path where the cordage is continuously advancing for slitting the covering of the cordage longitudinally on opposite sides thereof, means operable for periodically moving the slitting means into engagement with the cordage to slit the covering, stripping means operable for engaging portions of the covering on opposite sides of the longitudinal slits made by the slitting means, and driving means operatively connected to the stripping means for operating the cordage stopping means and the slitting means in timed relationship with each other and the stripping means, whereby the covering on the advancing cordage is slit between the previously made ring cuts and the ring cut and slitted portions thereof are subsequently engaged by the stripping means and removed from the cordage.

16. Apparatus for removing equally spaced portions of the covering from continuous lengths of jacketed cordage, which comprises means for continuously advancing a length of such cordage from a supply thereof along a predetermined path, a plurality of cutting blades mounted at spaced positions along and transverse to said path, means operable for temporarily stopping at periodic intervals the longitudinal movement of the portion of the cordage adjacent to the blades, pressing means for urging the stopped portion of the cordage against the spaced blades, rotary chucking means for engaging and turning the stopped portion of the cordage about its longitudinal axis while the cordage engages the blades so that the covering is ring cut at spaced points, movable means positioned adjacent to a subsequent point in said path where the cordage is continuously advancing for slitting the covering of the cordage longitudinally on opposite sides thereof, means operable for moving the slitting means into engagement with a portion of the cordage to slit the covering, a pair of rotatable stripping discs positioned on opposite sides of the path at a point beyond the slitting means, gripping elements provided on the discs for firmly gripping the slitted portions of the covering of the advancing cordage on opposite sides of the longitudinal slits previously made by the slitting means, cam means operated by the discs for operating the temporary stopping means and the slitting means in timed relationship with respect to said stripping discs, means for operating the cordage pressing means simultaneously with the temporary stoppage of a portion of the cordage by the temporary stopping means, and a common driving means for synchronizing the operation of the chucking means and the stripping discs, whereby the covering on the advancing cordage is slit between previously made spaced ring cuts and the ring cut and slitted portions thereof are subsequently engaged by the gripping elements on the stripping discs and removed from the cordage.

JULIUS H. PENN.
PAUL R. POWELL.

References Cited in the file of this patent

UNITED STATES PATENTS

| Number | Name | Date |
|---|---|---|
| 1,411,122 | Morrison | Mar. 28, 1922 |
| 1,549,429 | Bartlett | Aug. 11, 1925 |
| 1,802,453 | Wright | Apr. 28, 1931 |
| 1,934,660 | Fairchild | Nov. 7, 1933 |
| 1,954,817 | Jenkins | Apr. 17, 1934 |
| 1,987,959 | Knunti | Jan. 15, 1935 |
| 1,998,391 | Shaw | Apr. 16, 1935 |
| 2,020,113 | Ferguson | Nov. 5, 1935 |
| 2,120,398 | Edwards | June 14, 1938 |
| 2,374,211 | Kane | Apr. 24, 1945 |
| 2,429,611 | Churnell | Oct. 28, 1947 |